US006892234B2

(12) United States Patent
Knight (10) Patent No.: US 6,892,234 B2
(45) Date of Patent: May 10, 2005

(54) MULTI-TIERED ENTERPRISE MANAGEMENT SYSTEM AND METHOD INCLUDING A PRESENTATION SERVICES UNIT EXTERNAL TO THE ENTERPRISE

(75) Inventor: Erik A. Knight, The Colony, TX (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 10/170,284

(22) Filed: Jun. 12, 2002

(65) Prior Publication Data

US 2003/0233434 A1 Dec. 18, 2003

(51) Int. Cl.[7] .......................................... G06F 15/173
(52) U.S. Cl. ...................... 709/223; 709/224; 700/108; 717/102
(58) Field of Search .............................. 709/200–203, 709/217–219, 223–224; 700/108, 174, 171, 150, 109; 717/102; 706/5

(56) References Cited

U.S. PATENT DOCUMENTS

| | | | |
|---|---|---|---|
| 5,655,081 A | * | 8/1997 | Bonnell et al. ............. 709/202 |
| 5,696,701 A | * | 12/1997 | Burgess et al. ............... 714/25 |
| 6,058,431 A | * | 5/2000 | Srisuresh et al. ........... 709/245 |
| 6,085,198 A | * | 7/2000 | Skinner et al. ............. 707/103 |
| 6,125,363 A | * | 9/2000 | Buzzeo et al. .............. 707/100 |
| 6,131,120 A | * | 10/2000 | Reid ........................... 709/225 |
| 6,147,975 A | | 11/2000 | Bowman-Amuah ......... 370/252 |
| 6,226,637 B1 | | 5/2001 | Carey et al. ................... 707/4 |
| 6,321,231 B1 | * | 11/2001 | Jebens et al. ............... 707/104 |
| 6,341,287 B1 | * | 1/2002 | Sziklai et al. ............... 707/102 |
| 6,487,547 B1 | * | 11/2002 | Ellison et al. .................. 707/2 |

OTHER PUBLICATIONS

Chapter 2: Administration Overview, SilverStream Application Server architecture and outlines administrative tasks in SilverStream, 2001, pp. 1–8.*

* cited by examiner

Primary Examiner—Beatriz Prieto
(74) Attorney, Agent, or Firm—Baker Botts L.L.P.

(57) ABSTRACT

A multi-tiered remote enterprise management system and method are disclosed, whereby the management tool sets can be located in a part of the enterprise's architecture so that relatively high levels of system reliability can be achieved, faster deployments of the system can be made, enterprise investments can be better leveraged, bandwidth requirements can be minimized, and private IP addressed networks used require no special engineering designs.

38 Claims, 4 Drawing Sheets

MULTI-TIERED ENTERPRISE MANAGEMENT SYSTEM AND METHOD INCLUDING A PRESENTATION SERVICES UNIT EXTERNAL TO THE ENTERPRISE

TECHNICAL FIELD OF THE INVENTION

The present invention relates in general to the network and systems management field and, in particular, but not exclusively, to a multi-tiered remote management system and method for an enterprise.

BACKGROUND OF THE INVENTION

The management of clients' servers and desktop computers from a centralized management center requires the ability to overcome numerous technical barriers. The costs incurred by a developer/operator of centralized management systems in order to overcome these technical barriers reduces the developer's flexibility with respect to being able to bid on global solutions to the technical problems involved. For example, the problems and related issues involving networks, tools, staffing, deployment and redundancy all serve to reduce a developer's profits, lengthen the time it takes to deploy the solutions, and increase the difficulty of the global management techniques that can be used.

In an existing Service Management Centre (SMC) model, monitored client server customer equipment sends status information to a master database located in the SMC. This data can be used to generate reports, initiate trouble tickets, and provide historical data. The actual customer data is stored in databases located at the customer's site. These customer databases include security databases (e.g., containing data associated with individual and group access rights), Novell Directory Services (NDS) databases, domain or active directory databases, Windows Internet Naming Service (WINS) databases, Domain Name System (DNS) and other types of databases, and the actual file systems used.

Three components are typically associated with an existing SMC model: (1) Presentation, or what is viewed at the various management stations in an SMC; (2) Application, or the tools used to manage hardware and software in a customer's environment and process database information; and (3) Data Management, or the management of databases that store customer information, Structured Query Language (SQL) information, user security information, and file systems information.

For the existing SMC model, the Presentation, Application, and some of the Data Management components are located in the SMC. The remaining Data Management components are located at the customer's site (e.g., including security databases, file systems, and other managed data). An existing SMC model having this configuration is typically referred to as a Distributed Data Management Model. Notably, the Applications or tools are centrally located at the supporting SMC, along with the Presentation component (and some of the Data Management component). The users, devices and files being managed are located within the customer's network. In other words, the largest portion of the Data Management component resides in the customer's network. A significant problem with such a configuration is that the SMC's ability to process information and control functions resides in the SMC, the data management functions reside mainly in the customer's network, and these components are separated by a network. As a result, the performance or responsiveness of the Distributed Data Management Model is limited by the network's bandwidth and other network performance characteristics.

The Distributed Data Management Model is also referred to as the Two-Tier Client Server Model. If the SMC is monitoring and managing the functions of multiple customers' networks, the Data Management component residing at the SMC incurs an increased share of the load. In other words, the portion of the load at the customer site remains the same for any given customer, but the load is increased at the SMC as new customers are added. As a result, the Two-Tiered Client Server Model requires more processing power by the Application component as each new customer is added. Also, the network bandwidth requirements are increased as new customers are added, which reduces the bandwidth available for the other customers (and thereby reduces the scalability of the SMC).

SUMMARY OF THE INVENTION

In accordance with the present invention, a multi-tiered remote enterprise management system and method are provided, whereby the management tool sets can be located in a part of the enterprise's architecture so that relatively high levels of system reliability can be achieved, faster deployments of the system can be made, enterprise investments can be better leveraged, bandwidth requirements can be minimized, and private Internet Protocol (IP) addressed networks used require no special engineering designs.

An important technical advantage of the present invention is that a multi-tiered remote enterprise management system and method are provided, which enables an operator to rapidly assume the operational responsibilities of a client's network using the tools and processes that the client has already deployed.

Another important technical advantage of the present invention is that a multi-tiered remote enterprise management system and method are provided, whereby no significant additional hardware requirement is incurred by the SMC or client.

Yet another important technical advantage of the present invention is that a multi-tiered remote enterprise management system and method are provided, whereby software licenses purchased by a client can be used for remote management functions without requiring the purchase of additional licenses.

Still another important technical advantage of the present invention is that a multi-tiered remote enterprise management system and method are provided, whereby network bandwidth requirements are significantly reduced in comparison to previous techniques.

Still another important technical advantage of the present invention is that a multi-tiered remote enterprise management system and method are provided, whereby a client has the flexibility of being able to use any message protocol or IP number scheme desired.

Still another important technical advantage of the present invention is that a multi-tiered remote enterprise management system and method are provided, whereby no outage in either the SMC's network or client's network will affect the operations of the other's network.

Other technical advantages of the present invention will be readily apparent to one skilled in the art from the following figures, description and claims.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

The preferred embodiment of the present invention and its advantages are best understood by referring to FIGS. 1–5 of the drawings, like numerals being used for like and corresponding parts of the various drawings.

Figure 1:
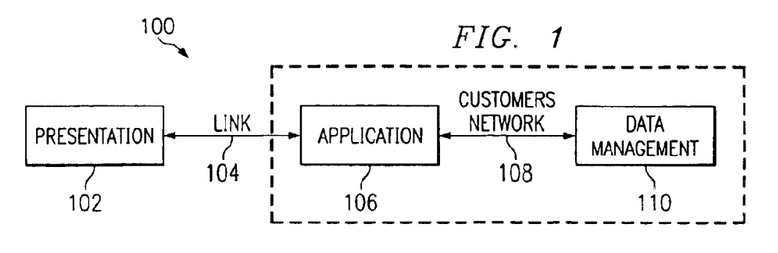
FIG. 1 illustrates an example multi-tiered remote management system, which can be used to implement an example embodiment of the present invention.

FIG. 1 illustrates an example multi-tiered remote management system 100, which can be used to implement an example embodiment of the present invention. For this example, multi-tiered system 100 can be implemented as a three-tiered client server system. As such, system 100 can include a presentation services unit 102, application services unit 106, and a data management services unit 110. Preferably, the presentation services unit 102 is coupled to the application services unit 106 by a suitable telecommunications link 104 for communicating data therebetween. Also, the applications services unit 106 and data management services unit 110 are preferably coupled together by a suitable telecommunications network 108 used by the customer whose enterprise functions are being monitored. For example, telecommunications link 104 or telecommunications network 108 can be implemented using separate Wide Area Networks (WANs), Medium Area Networks (MANs), Local Area Networks (LANs), proprietary links or networks, or some combination thereof. Notably, with the applications services unit 106 and data management services unit 110 configured locally to the customer within network 108 as shown in FIG. 1, all transactions can be computed locally, and the presentation associated with the transactions can be conveyed via link 104 to a presentation service unit 102 at a remote station. As a result, the processing and bandwidth requirements are significantly reduced at the presentation services unit 102, in comparison with previous techniques. Also, the multi-tiered client server system 100 is highly scalable, because multiple customers having their own application services units and data management services units can be coupled to one presentation service unit (e.g., 102).

For one example embodiment, a thin-client server processing environment can be used. As a result, the monitoring and management processing functions associated with the application services unit 106 and data management services unit 110 can be carried out on a client server, and a remote user can manipulate the screen, mouse, and keyboard updates at a workstation or other suitable monitoring unit to perform the functions of the presentation services unit 102.

A suitable remote control software package can be used by an SMC to remotely control servers and workstations that are running the system management tools. For example, if the management stations are using a Novell operating system, then the remote control software package or tools used can be, for example, Landesk® or ZEN®. Also, for example, if the management stations are using a Microsoft Windows NT operating system, then the remote control software package or tools used can be Systems Management Server (SMS®), Timbuktu®, or PCAnywhere®. If a UNIX operating system is used, then X Terminal management applications or system management tools can be used. As such, SMC personnel can use such a suitable tool and manage, for example, a Hewlett Packard (HP) OpenView® console, BMC Software Inc. console, Windows NT or Novell operating system applets, and other monitoring and management tools. Also, the SMC personnel can remotely process change/add/move requests, view system logs, process backups and restores, and conduct other administrative functions without having to convey the data across a WAN connection (e.g., link 104). Preferably, only screen or presentation data are conveyed across the network connection (e.g., link 104) from the client server to the SMC, which occurs only when a management session is actually being performed. As a result, the network bandwidth requirements are relatively low for the three-tiered client server system 100 shown in FIG. 1, and the response for the user can be as rapid as if the user were actually located at the client's site.

Figure 2:
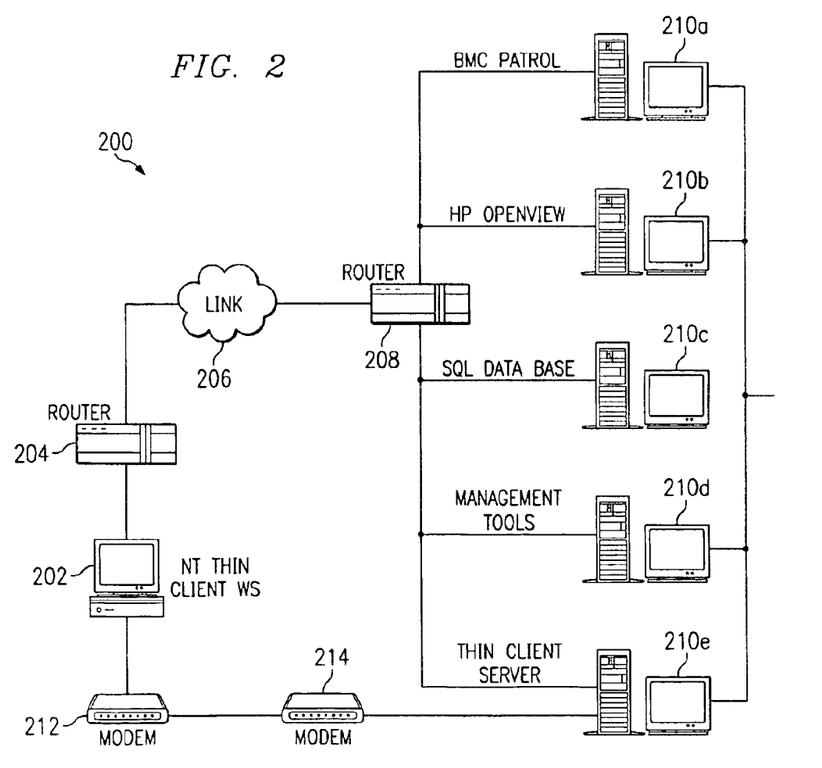
FIG. 2 illustrates an example multi-tiered remote management system, which can be used to implement an example embodiment of the present invention.

FIG. 2 illustrates an example multi-tiered remote management system 200, which can be used to implement an example embodiment of the present invention. For example, multi-tiered remote management system 200 can be used to implement a three-tiered client server system such as example system 100 shown in FIG. 1. Example system 200 can include a workstation 202 associated with an SMC. Preferably, for this example, workstation 202 can be a personal computer configured with suitable software as an NT Thin Client workstation. Notably, a thin client device is a low-cost computing device that can operate in a server-centric computing model. Typically, a thin client does not require a state-of-the-art, powerful processor or large amounts of RAM or ROM, because it can access applications from a central server or network. Thin-client/server computing is a server-based approach for delivering critical applications to end-user devices, whereby an application's logic can be executed on a server and the user interface is conveyed across a network to a client.

Workstation 202 can be coupled to a suitable telecommunications link (e.g., T1 connection via the Internet) 206 via a router 204. Link 206 can further couple workstation 202 to a client's network (e.g., LAN) via a second router 208, and to the client's tool servers 210a–210d. For this example, the tool servers 210a–210d can be coupled to a thin client server 210e. A backup or emergency connection between workstation 202 and thin client server 210e can be provided via dial-up telephone modems 212 and 214.

For this example, using an NT thin client workstation on the SMC side (e.g., at workstation 202), there is no requirement for NT trust relationships, active directory trees, Novell NDS trees, or UNIX domains to be used. As such, all of the SMC's management services can be performed within the client's own network (e.g., using the tools and functions associated with servers 210a–210e. Also, the SMC does not require the use of one or more large databases for storing client monitoring and reporting information, because the client information can be stored locally at the client's facilities.

For this example, on the client's side, the tool servers 210a–210d and thin client server 210e can be coupled together via a management backbone connection. As a result, the thin client management sessions can be performed within the client's network using the client's own naming conventions, addressing, security, and procedures. Monitoring information can be collected and stored at the client's site. Preferably, only the screen views (presentation information) of the monitoring and/or reporting information are conveyed from the client's network to workstation 202 via link 206. Notably, the network bandwidth requirements for the present invention are significantly lower than previous methods whereby the tools were resident at the SMC.

Figure 3:
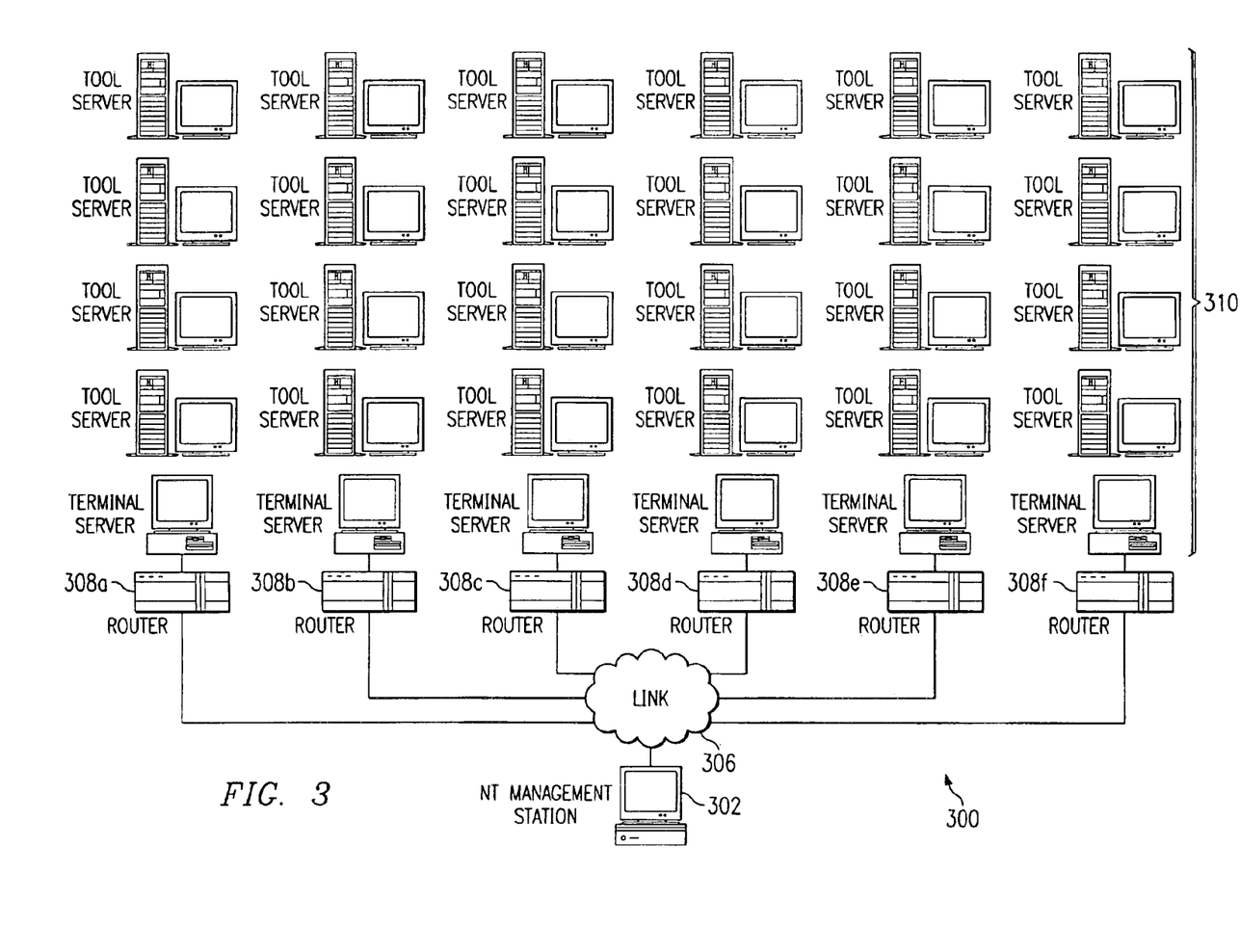
FIG. 3 illustrates an SMC workstation that can be used for handling multiple clients' presentations, in accordance with one example embodiment of the present invention.

The tools used in conjunction with tool servers 210a–210d may be standard or specialized software tools. In either case, no additional equipment is required at the SMC. If a plurality of clients are being serviced by one SMC, then a respective SMC workstation (e.g., similar to 202) may be used in conjunction with each client's network. Alternatively, a single SMC workstation (e.g., 202) can be used for handling the multiple clients' presentations. FIG. 3 illustrates such a multiple client configuration. For example, referring to FIG. 3, a workstation 302 (e.g., located at an SMC) can be coupled to a plurality of clients' networks via link 306 (e.g., T1 connection via the Internet) and respective routers 308a–308f. Each of the client's networks (e.g., denoted by 310 for one example client) can include a plurality of tool servers. As such, equipment failures occurring in one client's network do not affect the monitoring and collecting of information from the other clients' networks.

Figure 4:
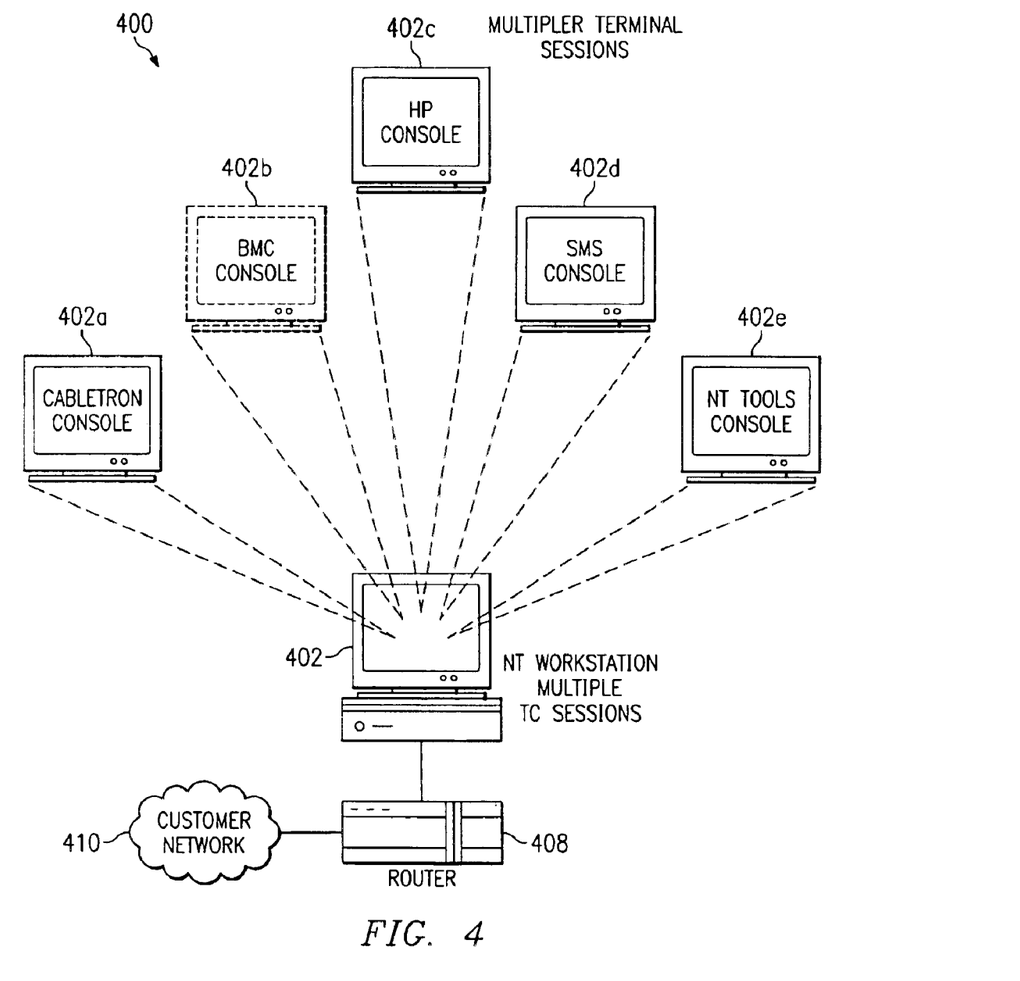
FIG. 4 illustrates how a single workstation at an SMC can be used to view a console application for various management applications as monitoring and/or reporting information is conveyed from a client's network, in accordance with one example embodiment of the present invention.

Management agents residing in the different clients' managed devices can convey their management information to databases in the clients' networks. Each client's tools for the managed devices can function normally, but each of the clients' devices can be monitored remotely at the SMC workstation 202 by viewing the console application of the various management applications involved. FIG. 4 illustrates how a single workstation at an SMC (e.g., 402) can be used to view a console application for various management applications as monitoring and/or reporting information is conveyed from a client's network 410 via a router 408. In other words, each screen 402a–402e can display real-time management information conveyed from the respective client tool (and tool server) used.

Management tools that do not function particularly well in a terminal server network environment can be candidates for a remote control application. For example, as illustrated by FIG. 3, it is possible to have remote control over several clients' servers or workstations simultaneously. Some of the management tools can include remote control type capabilities in their applications. A remote tool designation for any application can be used to select that application as the first one to be deployed. Furthermore, the one or more management workstations (e.g., 202) in an SMC can be dedicated to a particular client, or they can support multiple clients that use a common tool. For example, one workstation (e.g., 202) can support the management of all BMC consoles for several clients, another such workstation can support the management of all HP OpenView consoles for several clients, and so on.

Figure 5:
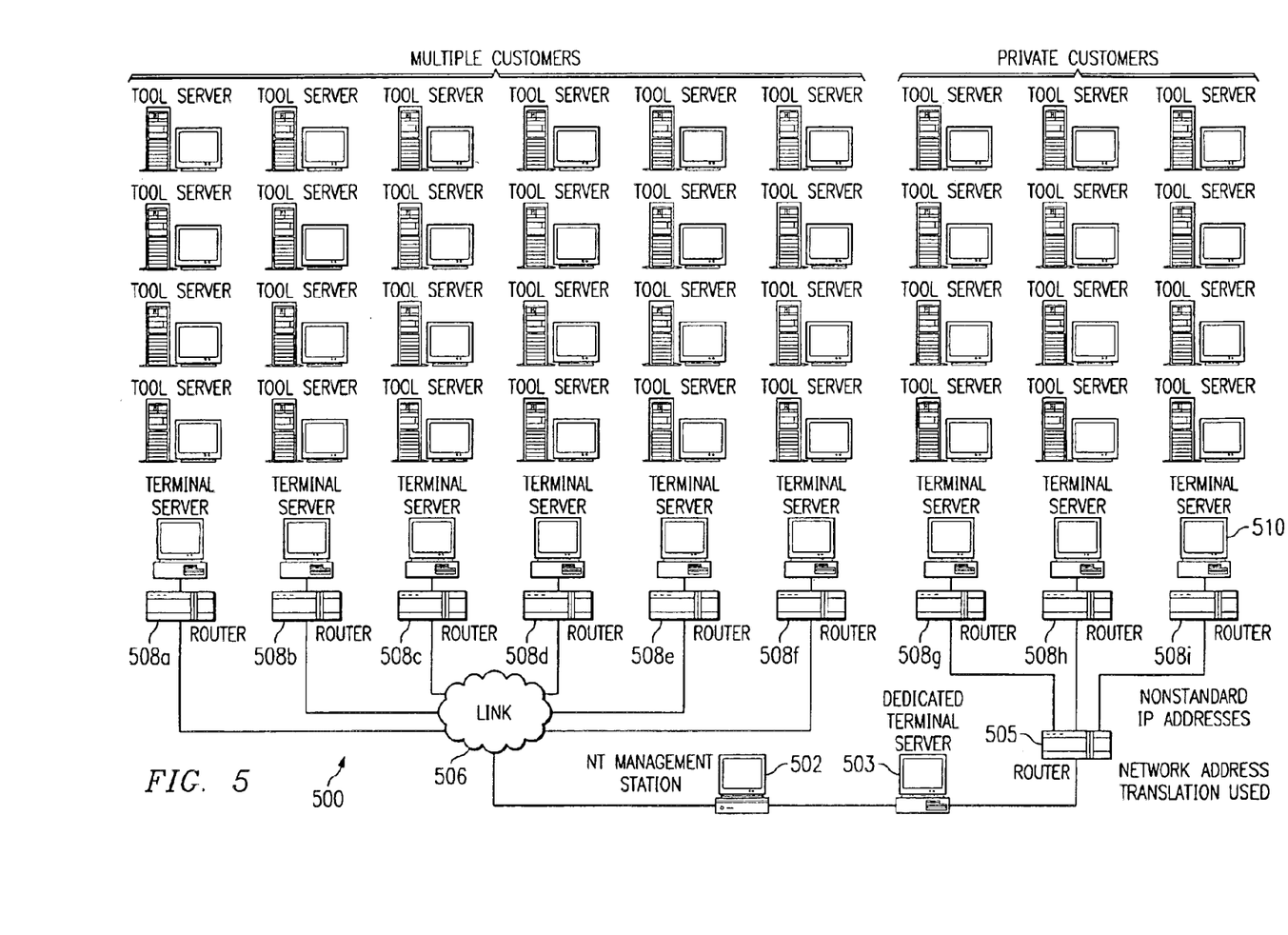
FIG. 5 illustrates an example multi-tiered remote management system, which can be used to implement an example embodiment of the present invention.

FIG. 5 illustrates an example multi-tiered remote management system 500, which can be used to implement an example embodiment of the present invention. For example, multi-tiered remote management system 500 can be used to implement a three-tiered client server system such as example system 100 shown in FIG. 1. An important function of system 500 is that one or more clients having unique requirements can be integrated into the multi-tiered system along with one or more other clients having no such requirements. For example, one or more clients can have a unique (private) IP scheme that requires a special connectivity arrangement to the SMC. Example system 500 can include a management workstation 502 at the SMC. For example, workstation 502 can be a personal computer configured as an NT thin client workstation. Workstation 502 can be coupled to a first plurality of clients' networks via link 506 (e.g., T1 connection over the Internet) and routers 508a–508f. For clients using non-standard network addressing (e.g., non-standard IP addresses), workstation 502 can be coupled to a second plurality of clients' networks via a terminal server 503 (e.g., thin client server), router 505, and routers 508g–508i. Each of the clients' networks shown can include a terminal server (e.g., thin client server 510) coupled to a respective set of tool servers. For this example, router 505 can provide a network address translation between the server 503 and each router 508g–508i in the respective clients' networks.

As illustrated above, in accordance with the present invention, an SMC can leverage its tool management and monitoring expertise across multiple client environments. As a result, clients can receive the benefits of using tools that they have already invested in and that perform an important function in the clients' network services. If a client has non-standard management tools in place, an SMC can take over the role of remotely managing these tools. For example, if a client's network is an IBM OS/2 server network using a Token Ring protocol for message conveyance, an SMC can remotely control the tools in such a network by using IBM tools or one or more of the client's remote management tools. As such, the protocol and addressing schemes used by a client are immaterial to the SMC. The use of network address translation can shield the SMC system developer from concern about protocols or addressing and still allow the tools in the SMC to be used for multiple clients.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A remote management system, comprising:

at least one enterprise network associated with an enterprise, the at least one enterprise network comprising:

a data management services unit stored on the enterprise network associated with the enterprise and operable to store at the enterprise network information associated with at least one management operating or monitoring function, the management operating or monitoring function being associated with a system management tool stored on the enterprise network associated with the enterprise and providing system monitoring and management for the enterprise; and an application services unit stored on the enterprise network associated with the enterprise and operable to process at the enterprise network the information associated with the management operating or monitoring function; and a presentation services unit external to the enterprise network associated with the enterprise and remotely coupled to the enterprise network associated with the enterprise, the presentation services unit operable to display data associated with the information processed at the enterprise network, the information being associated with the management operating or monitoring function, the data associated with the information processed at the enterprise network having been communicated to the external presentation services unit from the enterprise network, substantially all processing of the information associated with the management operating or monitoring function being performed within the enterprise network associated with the enterprise rather than at the presentation services unit external to the enterprise.

2. The remote management system of claim 1, wherein the presentation services unit is remotely coupled to the enterprise network associated with the enterprise via an Internet connection.

3. The remote management system of claim 1, wherein the enterprise network comprises at least one of a LAN, MAN, and WAN.

4. The remote management system of claim 1, wherein the presentation services unit comprises a workstation in a Service Management Center.

5. The remote management system of claim 1, wherein the remote management system comprises a three-tiered client server system.

6. The remote management system of claim 1, wherein the application services unit and the data management services unit comprise at least one management tool server, the management tool server comprising one or more system management tools for managing or monitoring the enterprise network associated with the enterprise.

7. The remote management system of claim 1, wherein the application services unit and the data management services unit comprise at least one management tool server coupled to a thin client server, the presentation services unit being remotely coupled to the thin client server.

8. The remote management system of claim 1, wherein the presentation services unit comprises a thin client workstation.

9. The remote management system of claim 1, wherein the presentation services unit is remotely coupled to the at least one enterprise network via a communications link.

10. The remote management system of claim 1, wherein the presentation services unit further comprises a plurality of presentation services units.

11. The remote management system of claim 1, wherein the application services unit and the data management services unit further comprise a plurality of application services units and data management services units, each application services unit and an associated one of the plurality of data management services units being associated with a distinct enterprise network associated with distinct enterprise.

12. The system of claim 2, wherein the enterprise network associated with the enterprise comprises a private enterprise network comprising a plurality of management tool servers, the private enterprise network using a plurality of nonstandard Internet Protocol (IP) addresses, a router coupling the presentation services unit to the private enterprise network and operable to perform network address translation on the nonstandard IP addresses of the private enterprise network.

13. The software of claim 12, wherein the enterprise network associated with the enterprise comprises a private enterprise network comprising a plurality of management tool servers, the private enterprise network using a plurality of nonstandard Internet Protocol (IP) addresses, the software further operable to, using a router coupling the service management center to the private enterprise network, perform network address translation on the nonstandard IP addresses of the private enterprise network.

14. The system of claim 1, comprising a plurality of distinct enterprise networks each associated with a distinct corresponding enterprise, each enterprise network comprising:
a management tool server comprising one or more management tools for managing the enterprise network or one or more devices in the enterprise network;
a terminal server coupled to the management tool server and further coupled, via a router, to a communications network external to the enterprise network;
the presentation services unit coupled to the management tool server via the communications network external to the enterprise network.

15. The system of claim 1, wherein:
the enterprise network comprises a first enterprise network associated with a first enterprise, the first enterprise network using one or more standard IP addresses for connectivity, the presentation services unit being coupled to the first enterprise network via a first network external to the first enterprise network; and
the system further comprises a second enterprise network associated with a second enterprise, the second enterprise network comprising a private enterprise network that uses one or more nonstandard IP addresses for connectivity, the presentation services unit coupled to the second enterprise network via a dedicated terminal server external to the second enterprise network, the dedicated terminal server coupled to a router external to the second enterprise network and operable to perform network address translation on the nonstandard IP addresses used within the second enterprise network.

16. A method for remotely managing at least one enterprise network associated with an enterprise, comprising:
storing in the at least one enterprise network associated with the enterprise information associated with at least one management operating or monitoring function, the management operating or monitoring function being associated with a system management tool stored on the enterprise network associated with the enterprise and providing system monitoring and management for the enterprise;
processing at the enterprise network associated with the enterprise the information associated with the management operating or monitoring function;
conveying the information processed at the enterprise network from the enterprise network associated with the enterprise to a remote service management center external to the enterprise network; and
displaying the processed information associated with the management operating or monitoring function at the service management center remote from the enterprise network associated with the enterprise, substantially all processing of the information associated with the management operating or monitoring function being performed within the enterprise network associated with the enterprise rather than at the remote service management center external to the enterprise.

17. The method of claim 16, wherein the conveying step comprises receiving the processed information via an Internet connection remotely coupling the enterprise network to the service management center.

18. The method of claim 17, wherein:
the enterprise network associated with the enterprise comprises a private enterprise network comprising a plurality of management tool servers, the private enterprise network using a plurality of nonstandard Internet Protocol (IP) addresses; and
the method further comprises using a router coupling the system management center to the private enterprise network, performing network address translation on the nonstandard IP addresses of the private enterprise network.

19. The method of claim 16, wherein the enterprise network comprises at least one of a LAN, MAN, and WAN.

20. The method of claim 16, wherein the step of displaying the processed information at the remote service management center comprises displaying the processed information at a workstation in the remote service management center.

21. The method of claim 16, wherein the steps are performed via a three-tiered client server system.

22. The method of claim 16, wherein the storing and processing steps are performed via at least one management tool server, the management tool server comprising one or more system management tools for managing or monitoring the enterprise network associated with the enterprise.

23. The method of claim 16, wherein the storing and processing steps are performed via at least one management tool server associated with the enterprise network coupled to a thin client server associated with the enterprise network, the service management center being remotely coupled to the thin client server.

24. The method of claim 16, wherein the displaying step is performed via a thin client workstation.

25. The method of claim 16, wherein the conveying step comprises coupling a remote management workstation to the enterprise network via a communications link.

26. The method of claim 16, wherein the enterprise network is one of a plurality of distinct enterprise networks each associated with a distinct corresponding enterprise, each enterprise network comprising:
a management tool server comprising one or more management tools for managing the enterprise network or one or more devices in the enterprise network;
a terminal server coupled to the management tool server and further coupled, via a router, to a communications network external to the enterprise network;
the service management center coupled to the management tool server via the communications network external to the enterprise network.

27. The method of claim 16, wherein:
the enterprise network comprises a first enterprise network associated with a first enterprise, the first enterprise network using one or more standard IP addresses for connectivity, the service management center being coupled to the first enterprise network via a first network external to the first enterprise network; and
a second enterprise network is associated with a second enterprise, the second enterprise network comprising a private enterprise network that uses one or more nonstandard IP addresses for connectivity, the service management center coupled to the second enterprise network via a dedicated terminal server external to the second enterprise network; and
the dedicated terminal server coupled to a router external to the second enterprise network, the method further comprises performing network address translation on the nonstandard IP addresses used within the second enterprise network.

28. A system for remotely managing at least one enterprise network associated with an enterprise, comprising:
means for storing in the at least one enterprise network associated with the enterprise information associated with at least one management operating or monitoring function, the management operating or monitoring function being associated with a system management tool stored on the enterprise network associated with the enterprise and providing system monitoring and management for the enterprise;
means for processing at the enterprise network associated with the enterprise the information associated with the management operating or monitoring function;
means for conveying the information processed at the enterprise network from the enterprise network associated with the enterprise to a remote service management center external to the enterprise network; and
means for displaying the processed information associated with the management operating or monitoring function at the service management center remote from the enterprise network associated with the enterprise, substantially all processing of the information associated with the management operating or monitoring function being performed within the enterprise network associated with the enterprise rather than at the remote service management center external to the enterprise.

29. Software for remotely managing at least one enterprise network associated with an enterprise, the software embodied in a computer-readable medium and when executed operable to:
store in the at least one enterprise network associated with the enterprise information associated with at least one management operating or monitoring function, the management operating or monitoring function being associated with a system management tool stored on the enterprise network associated with the enterprise and providing system monitoring and management for the enterprise;
process at the enterprise network associated with the enterprise the information associated with the management operating or monitoring function;
convey the information processed at the enterprise network from the enterprise network associated with the enterprise to a remote service management center external to the enterprise network; and
display the processed information associated with the management operating or monitoring function at the service management center remote from the enterprise network associated with the enterprise, substantially all processing of the information associated with the management operating or monitoring function being performed within the enterprise network associated with the enterprise rather than at the remote service management center external to the enterprise.

30. The software of claim 29, operable to receive the processed information via an Internet connection remotely coupling the at least one enterprise network to the service management center.

31. The software of claim 29, wherein the enterprise network comprises at least one of a LAN, MAN, and WAN.

32. The software of claim 29, operable to display the processed information at the remote service management center by displaying the processed information at a workstation in the remote service management center.

33. The software of claim 29, operable to store and process the information associated with the management operating or monitoring function via at least one management tool server, the management tool server comprising one or more system management tools for managing or monitoring the enterprise network associated with the enterprise.

34. The software of claim 29, operable to store and process the information associated with the management operating and monitoring function via at least one management tool server associated with the enterprise network coupled to a thin client server associated with the enterprise network, the service management center being remotely coupled to the thin client server.

35. The software of claim 29, operable to display the processed information via a thin client workstation.

36. The software of claim 29, operable to convey the information using a communications link remotely coupling a remote management workstation to the enterprise network.

37. The software of claim 29, wherein the at least one enterprise network is one of a plurality of distinct enterprise networks each associated with a distinct corresponding enterprise, each enterprise network comprising:

a management tool server comprising one or more management tools for managing the enterprise network or one or more devices in the enterprise network;

a terminal server coupled to the management tool server and further coupled, via a router, to a communications network external to the enterprise network;

the service management center coupled to the management tool server via the communications network external to the enterprise network.

38. The software of claim 29, wherein:

the enterprise network comprises a first enterprise network associated with a first enterprise, the first enterprise network using one or more standard IP addresses for connectivity, the service management center being coupled to the first enterprise network via a first network external to the first enterprise network; and a second enterprise network is associated with a second enterprise, the second enterprise network comprising a private enterprise network that uses one or more nonstandard IP addresses for connectivity, the service management center coupled to the second enterprise network via a dedicated terminal server external to the second enterprise network, the dedicated terminal server coupled to a router external to the second enterprise network; and the software further operable to perform network address translation on the nonstandard IP addresses used within the second enterprise network.

* * * * *